US008799082B2

(12) United States Patent
Jain

(10) Patent No.: US 8,799,082 B2
(45) Date of Patent: Aug. 5, 2014

(54) GENERALIZED ONLINE MATCHING AND REAL TIME RISK MANAGEMENT

(75) Inventor: Kamal Jain, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1207 days.

(21) Appl. No.: 11/680,341

(22) Filed: Feb. 28, 2007

(65) Prior Publication Data
US 2008/0104115 A1 May 1, 2008

Related U.S. Application Data

(60) Provisional application No. 60/863,729, filed on Oct. 31, 2006.

(51) Int. Cl.
G06Q 30/00 (2012.01)

(52) U.S. Cl.
USPC .............. 705/14.73; 705/14.4; 705/26.3

(58) Field of Classification Search
CPC ................ G06Q 30/02; G06Q 30/08
USPC ............ 705/1–30, 14.73, 14.4, 26.3; 707/100–120, 104.1; 715/300–350
See application file for complete search history.

(56) References Cited

U.S. PATENT DOCUMENTS

| | | | |
|---|---|---|---|
| 6,009,409 A * | 12/1999 | Adler et al. ............. 705/14 |
| 6,144,944 A | 11/2000 | Kurtzman et al. | |
| 6,285,987 B1 | 9/2001 | Roth et al. | |
| 6,990,462 B1 | 1/2006 | Wilcox et al. | |
| 7,085,732 B2 | 8/2006 | Gould | |
| 2004/0148222 A1 | 7/2004 | Sabella et al. | |
| 2004/0267612 A1 | 12/2004 | Veach | |
| 2006/0069614 A1 | 3/2006 | Agarwal et al. | |
| 2006/0173743 A1 | 8/2006 | Bollay | |
| 2007/0061240 A1 | 3/2007 | Jain et al. | |

FOREIGN PATENT DOCUMENTS

WO 023629 A1 4/2002

OTHER PUBLICATIONS

Mehta, A, Saberi, A, Vazirani, U, and Vazirani, V, "Adwords and Genralized Online Matching", in Proceedings of the 46th IEEE Symposium on Foundations of Computer Science, 2005, p. 1-21.*
Glineur, Francois, "Proving Strong Duality for Geometric Optimization Using a Conic Formulation", in Annals of Operations Research 105, p. 155-184, 2001.*
Freund, Ari, Rawitz, Dror, "Combinatorial Interpretations of Dual Fitting and Primal Fitting", in WAOA, LNCS 2909, p. 137-150, 2004.*
Shmoys et al. "Approximation algorithm for facility location problem", 1997. Proceedings of 29th annual ACM Symposium on Theory of Computing, El Paso, Texas, United STates, p. 265-274(1-21).*

(Continued)

Primary Examiner — Sun Li
(74) Attorney, Agent, or Firm — Dan Choi; Carole Boelitz; Micky Minhas

(57) ABSTRACT

The claimed subject matter provides an architecture and associated schema for facilitating advantageous solutions the generalized online matching problem. The architecture can employ a blended schema that includes distinct aspects of both primal-dual schema and dual-fitting schema. In accordance therewith, the blended schema can provide algorithms that yield solutions in accordance with a competitive ratio of $1-1/e$. In addition, the blended schema can be extended to provide for rich risk management features. Further, an addition of stochastic information can be employed in connection with the blended schema to improve the results beyond the competitive ratio.

15 Claims, 9 Drawing Sheets

(56) References Cited

OTHER PUBLICATIONS

Dulluri, et al. "Allocation of Advertising Space by a Web Server Provider Using Combinatorial Auctions" (2005) Sadhana vol. 30, Parts 2 & 3, 18 pages.

Mahdian, et al. "AdWords Allocation Problem with Unreliable Estimates" (2006) MS&E Technical Reports, 18 pages.

Iyengar, et al. "Characterizing Optimal Adword Auctions" (2006) ACM, pp. 2-9.

Edelman, et al. "Internet Advertising and the Generalized Second Price Auction: Selling Billions of Dollars Worth of Keywords" (2006) http://facultygsb, 25 pages.

Guha, et al. "Greedy Strikes Back: Improved Facility Location Algorithms" (1999) Journal of Algorithms, Vo. 31, Issue 1, pp. 228-248.

Jain, et al. "Greedy Facility Location Algorithms Analyzed Using Dual Fitting with Factor-Revealing LO" (2003) ACM, 30 pages.

Jain, et al. "Market Equilibria for Homothetic, Quasi0Concave Utilities and Economies of Scale in Production" (2005) SODA, 9 pages.

Kalyanasundaram, et al. "An Optimal Deterministic Algorithm for Online b-Matching" (2000) Theoretical Computer Science, vol. 233, Issue 1-2, pp. 319-325.

Mahdian, et al. "Improved Algorithms for Metric Facility Location Problems" (2002) MIT Laboratory Science, 16 pages.

Mehta, et al. "Adwords and Generalize Online Matching" (2005) FOCS, 19 pages.

\* cited by examiner

GENERALIZED ONLINE MATCHING AND REAL TIME RISK MANAGEMENT

CROSS-REFERENCE TO RELATED APPLICATIONS

This application claims the benefit of U.S. Provisional Application Ser. No. 60/863,729, filed Oct. 31, 2006, entitled "ONLINE AD ALLOCATION AND RISK MANAGEMENT." The entirety of this application is incorporated herein by reference.

BACKGROUND OF THE INVENTION

Today, online content is often closely associated with online advertisements. Thus, websites or web applications and the like that deliver content to users can also act as advertisement hosts for advertisers. That is, while a user receives certain content, that user can simultaneously be exposed to relevant ads. For example, Internet search engines can sell ad slots to advertisers based upon the search string entered by an end user or the search results. In another example, webmail providers can parse text from emails in order to determine an appropriate category for an advertisement, and once determined, display an ad from an advertiser in that category. Of course many further examples exist.

As can be appreciated, potential advertisement space (e.g., ad slots) can arise in a very dynamic and sudden fashion. For example, the particular keywords that an end-user enters into a search engine, the actual text of an email that is sent or received by a user, etc. cannot be known in advance, even if predictive algorithms, empirical data and the like can provide for estimates. Accordingly, it is not clear a priori how many ad slots for any given ad category will be available to advertisers for purchase.

Moreover, while advertisers may have designated a budget to spend on ad slots, it is presumed to be in their best interest to go over that budget should the ad slots be available. That is, even though each addition ad slot will cost the advertiser money beyond the designated budget, the additional ads will translate into additional clicks, which will in turn equate to more revenue-generating transactions. Hence it is in the interest of advertisers to purchase available ad slots and also in the interest of the ad host to sell all available ad slots, even though number and/or category of ads cannot be known in advance and the actual allocation of such can present various difficulties.

Accordingly, generalized online matching was recently introduced in a paper by A. Mehta, et. al., entitled, "Adwords and Generalized Online Matching" in the context of Ad-Auctions. The disclosure provides two algorithms, both very simple, with competitive ratio 1−1/e (e.g., 63.2%) under the assumption that the maximum bid is negligible compare to the minimum budget. However, the proof of both algorithms is very complicated, long, and, as termed by the authors themselves, "counter-intuitive". Moreover, the proof supplied for the algorithms is provided in stages and introduce one additional complication of the problem in each stage. In addition, there is evidence that the algorithms themselves are not optimal and do not lend themselves to additional flexibility such as application to other aspects of the Ad-Auction universe.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can facilitate allocation of ads to ad slots in an online fashion. For example, an "online fashion" can be aimed at a performance ratio (e.g., 1−1/e) to represent the optimal performance of an online schema relative to a best known offline solution. In accordance therewith, the architecture can employ a blended schema in order to match ad slots offered by ad hosts to ads from bidding suppliers. In addition, in accordance with an aspect, variations on the blended schema can allow for managing risk profiles associated with advertisers that bid for ad slots. Moreover, in accordance with an aspect, the schema can be further varied to provide for optimizing ad allocation based upon stochastic information, even when the stochastic information is inaccurate.

In accordance with an aspect of the claimed subject matter, the schema can be simpler, more intuitive, and/or more flexible than conventional approaches, and hence more suitable to be extended to other generalizations in the ad-auction space. In one aspect, the schema can be a blended schema in that the schema can be based on blending of standard techniques of dual-fitting schema together with primal-dual schema. Such a blending can slightly generalize both techniques. For example, instead of making the duals feasible at the end of the algorithm, as done in dual-fitting, the duals can be kept feasible during the entire algorithm, as done in the primal-dual schema. Similarly, instead of bounding the dual at the end of the algorithm, as done in the primal-dual schema, the dual can be kept bounded during the entire algorithm. These and other techniques described herein can be more powerful and can improve the approximation ratio of the classical metric facility location problem, which itself is currently slightly off from the best known hardness ratio.

In addition, an approach that employs the techniques described herein can be utilized to extend the results of Generalized Online Matching to a more general problem of Real Time Risk Management. In another generalization, it can be illustrated that this approach can be adapted by practitioners to suit practical scenarios. In particular, this approach can be used in connection with any available stochastic information to improve beyond the traditional competitive ratio of 1−1/e.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
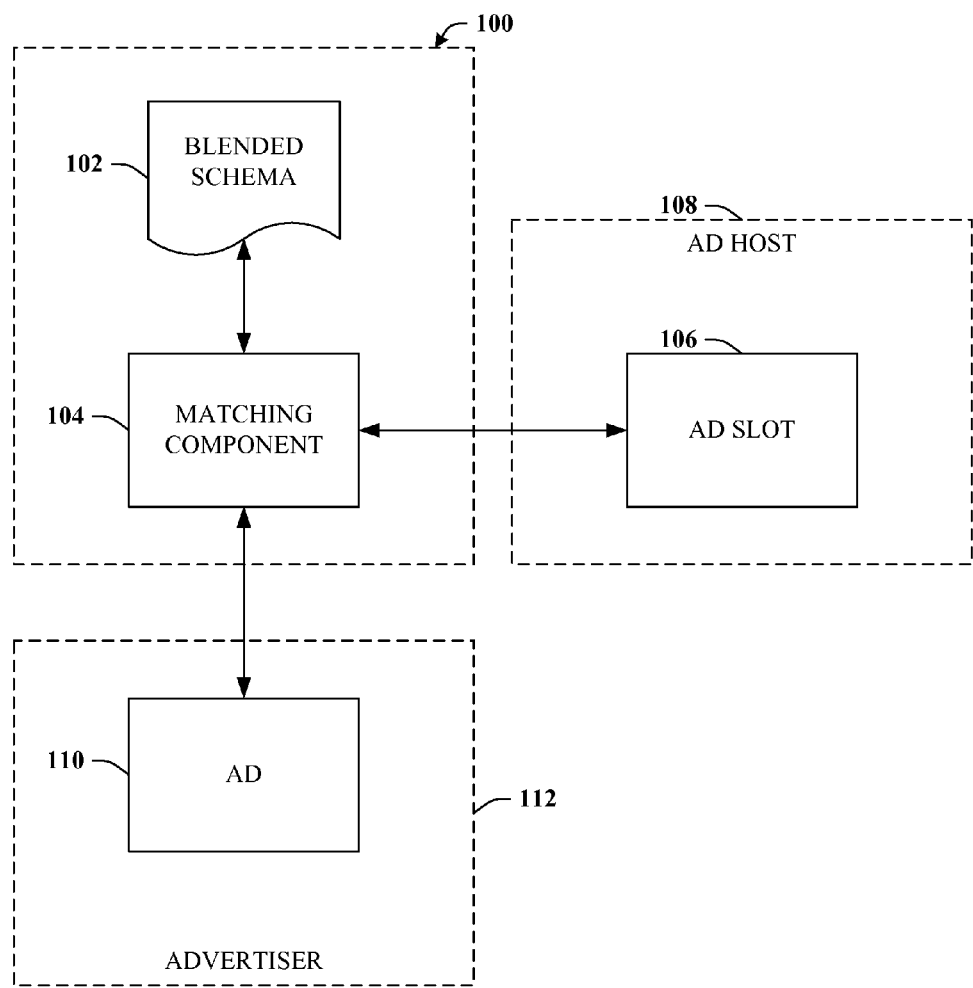
FIG. 1 is a block diagram that illustrates a computer-implemented system that allocates ads to ad slots in accordance with a blended schema.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "schema", "algorithm" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a computer implemented system 100 that can allocate advertisements to ad slots is depicted. Generally, the system 100 can include a blended schema 102 that can be, for example, a schema that blends aspects of both a primal-dual schema and a dual-fitting schema, which is further defined in connection with FIG. 2. In addition, the system 100 can also include a matching component 104 that can employ the blended schema 102 to match ad slots such as ad slot 106 offered by an ad host 108 to ads such as ad 110 from a bidding advertiser 112.

For example, in the online domain, an advertiser (e.g., advertiser 112) will often purchase advertising space from an advertising host (e.g., ad host 108). The advertising space can be in the form of ad slot 106 that pertains to a suitable channel, context, and/or keyword for the ad 110 of the advertiser 112. It is to be appreciated that many types of online advertisement opportunities differ from counterpart advertisements in the brick and mortar world in that there may not be a static location or forum for the advertisement. In particular, online advertisements can be subject to what can be termed a generalized online matching problem.

For instance, conventional offline advertisements can be reserved for a particular location such as a roadway billboard; or a particular forum such as at page 2 of a published magazine. In contrast, in the online world, advertising opportunities can arise dynamically based upon a variety of factors such as the behavior, interaction, or background of an online user. As a simple illustration, a user of an online search service might input the keyword "car", whereupon along with a number of search results, banner advertisements for, say, local car dealerships can be displayed. Thus, while an ad slot 106 for a car from a local car dealership can arise dynamically rather than being preordained by a magazine editor or a billboard leasing agency, the ad slot 106 can still be matched to a suitable ad 110. In accordance therewith, the ad host 108 can employ the matching component 104.

While related matching techniques currently exist, the blended schema 102 can be employed by the matching component 104 to, in accordance with one aspect of the claimed subject matter, provide a simpler and more elegant approach to solving the generalized online matching problem. In addition, the blended schema 102 can be employed to, e.g., provide a near optimal competitive ratio of 1−(1/e). The competitive ratio can be the ratio of online advertisement revenue generated by the ad host 108 relative the revenue generated by the best offline algorithm. The approaches described herein can be based on well-understood schemas such as primal-dual techniques as well as dual-fitting techniques. For example, these schemas (e.g., primal-dual and dual-fitting) can be blended in order to develop a more flexible schema, such as a blended schema 102.

The aforementioned approach can yield a further generalization of the generalized online matching problem, which can be employed in order to extend the use of the blended schema in a variety of ways. As one example, Real Time Risk Management can be assessed and acted upon in order to, e.g., allow individual advertisers 112 to tailor their bids for ad slots 106. For example, one reason advertisers 112 provide a budget for their marketing campaign is the risk management aspect. Conventionally, advertisers 112 pay only after a user clicks to their ad. Yet, inherent in the nature of an advertiser 112 bid is that the average profit from a user's visit is more than the price bid for the click on the ad 110. Thus, limiting by way of budgetary constraints the number of users visiting the advertiser 112 website is tantamount to limiting the amount of profit to be made.

It can be appreciated that this is not unlike other investment decisions. For instance, in the securities market, even if one knows the expected value of a stock is likely to be significantly higher tomorrow than it is today, still one might want to limit an investment in that stock, largely in order to mitigate risk. Today's internet stock brokers provide various automated tools to manage the risk, e.g., if a stock reaches the particular price, then an order to execute a previously specified trade of the stock and/or the related trade for call/put options can be generated.

Moreover, in the lightening fast framework of ad-auction, more sophisticated Risk Management tools are often beneficial. One of the simplest ways of managing risk is to limit the investment. That is generally what the current model of limited budgets for advertisers 112 on advertising dollars spent is aimed at achieving. A slightly more sophisticated risk management tool to allow an advertiser 112 to specify in advance her risk profile. For example, the advertiser 112 can specify how aggressively to bid based upon, e.g., how much has been spent thus far. When the advertiser 112 has not spent very much then an aggressive bidding model may be appropriate. However, after the advertiser 112 has already spent a substantial amount then the advertiser 112 may want to spend additional amounts only on bargains, e.g., the advertiser 112 may want to specify a discount factor to indicate that ad slot 106 will be purchased only if the slot 106 can be purchased at some fraction of the bid. Clearly, generalized online matching is a special case of this setting. The advertiser 112 can specify that she is willing to pay the bid when her spending is smaller than the budget and otherwise the advertiser 112 is willing to pay zero-th fraction of the bid. The offline case of this more general problem is a convex program. The convex program can be solved online with a competitive ratio of 1−(1/e), but it need only be for the cases in which the specified discount factors are step functions, where each step is sufficiently long. Further detail relating to risk management features can be found in connection with FIG. 4.

A second generalization that can be employed is to co-mingle the online aspect of the ad-auction problem with the stochastic aspect to achieve even better competitive ratio above and beyond 1−1/e. In practice, ad-auction can be a highly repetitive proceeding. Accordingly, one may be able to estimate a lower bound on the fraction of an advertiser 112 budget which will be spent. This estimate can be very conservatively made base on, for example, an auctioneer (e.g., ad host 108) examining the bids and budget of an advertiser 112. Today, ad hosts 108 already provide an estimate of the budget that can be spent by looking at the bids. The blended schema 102 can take advantage of these stochastic estimates. In accordance therewith, the competitive ratio can improve as the estimate improves. In the worst case, when all the lower bounds are zero, this problem also reduces back to the generalized online matching problem. Further discussion with respect to employing stochastic information to improve the competitive ratio can be found in connection with FIG. 5.

Returning to the discussion at hand, the techniques of dual-fitting and primal-dual are often used in approximation algorithms for a minimization problem, such as when matching the ad 110 to the ad slot 106. Both of these techniques are based on suitable linear relaxations of certain aspects. Before continuing the discussion of FIG. 1, it is advantageous to take a closer look at the various schemas referred to herein. A more detailed discussion of primal-dual, dual-fitting, and blended schemas can be found with reference to FIG. 2.

Figure 2:
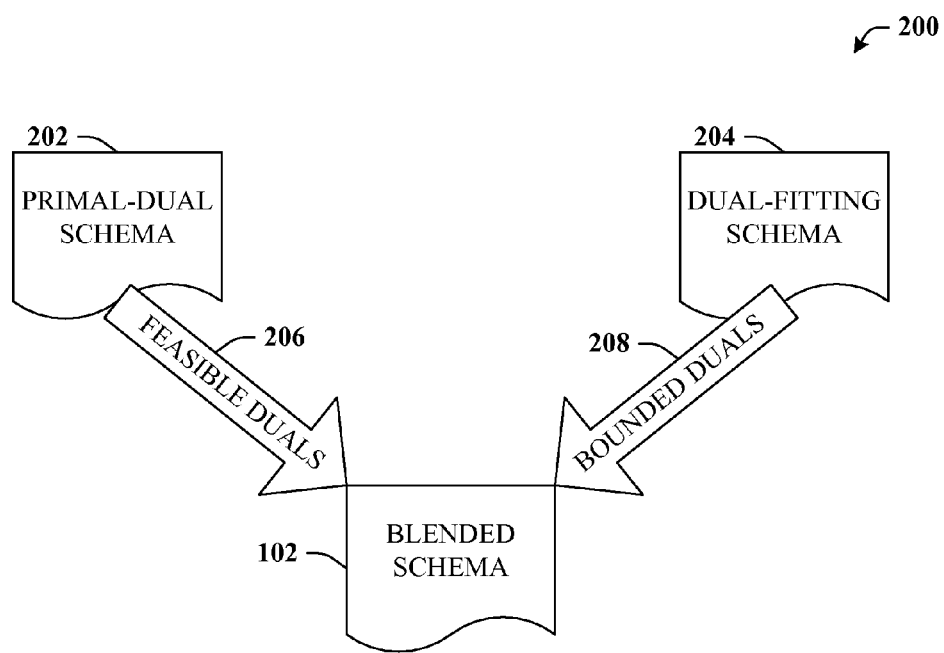
FIG. 2 illustrates an exemplary illustration of various distinguishing features of the blended schema.

Turning now to FIG. 2, an exemplary illustration 200 of various distinguishing features of the blended schema 102 is depicted. The illustration 200 can include the blended schema 102 that can employ distinct features of both a primal-dual schema 202 and a dual-fitting schema 204. Conventionally, primal-dual schema 202 has 0-1 binary variables, and covering constraints in the primal program. These covering constraints can have corresponding dual variables in the dual-program. The primal variables can have corresponding packing constraints in the dual-program as well. In accordance therewith, the primal-dual schema 202 can start with a zero-primal and a zero-dual, wherein the primal-dual schema 202 starts raising the dual, typically uniformly.

One defining feature of the primal-dual schema 202 is that the dual program is kept feasible at all times (e.g., feasible duals 206). This forces a situation such that whenever a packing constraint in the dual program tightens, dual variables participating in the constraints are frozen. At this point, primal complementary slackness condition can allow converting the corresponding primal variable to 1. The algorithm stops when all the dual variables are frozen, at which time the primal is also feasible. An approximation factor, F, can be derived by comparing the primal to the dual solution obtained.

The dual-fitting schema 204 typically has the same setting of primal-program and dual-program as in the case of primal-dual schema 202. As with the case of the primal-dual schema 202, the dual-fitting schema 204 program can start with a zero primal and a zero dual. The dual-fitting schema 204 can run iteratively, and in each iteration, one of the primal variables can be converted in to 1 based on some simple "greedy" criteria. For each iteration, a feasible dual can be created incrementally to attest to the fact that the choice was made based on the greedy criteria.

A defining feature of the dual-fitting schema 204 is that the value of the dual in each iteration is the same as the cost of the primal paid in that iteration. In other words, the dual is bounded by the iteration cost (e.g., bounded duals 208). When the dual from all iterations are superimposed then the resulting dual may not be feasible. Indeed, if it is then the dual-fitting schema 204 has actually found the optimal solution.

This is due to the fact that the entire cost of the primal picked is equal to the entire superimposed dual. The dual-fitting schema 204 can look for the minimum factor $F \geq 1$, such that when the entire superimposed dual is scaled down by F, the dual becomes feasible. F will clearly be the approximation factor.

While the primal-dual schema 202 and the dual-fitting schema 204 share a number of aspects in common, each has distinct aspects that can be blended to create a more flexible schema (e.g., blended schema 102). In particular, the blended schema 102 can maintain feasible duals for each iteration, which is a distinct property 206 of the primal-dual schema 202. In addition, the blended schema 102 can maintain bounded duals, which is a property 208 of the dual-fitting schema 204.

Accordingly, the blended schema 102 can be employed in a maximization problem, in a manner that follows the dual-fitting schema 204 with at least one distinguishing exception. In particular, since the dual constraints can be covering constraints instead of packing constraints, one can look for the maximum factor $F \geq 1$, such that when the entire superimposed dual is scaled up by 1/F, the dual becomes feasible. In addition to this straightforward adaptation of dual-fitting schema 204 for maximization problem, the blended schema 102 can further co-mingle the dual-fitting schema 204 with the primal-dual schema 202 in other ways.

As one example, the blended schema 102 can combine the dual-fitting schema 204 with primal-dual schema 202 in the context of a minimization problem as well. Since the main issue in this context is a maximization problem, one can explain the blending in this environment such that the primal program can have a maximization objective function, 0-1 binary variables and packing constraints. The dual program can have non-negative variables and covering constraints.

Like the dual-fitting schema 204, the blended schema 102 can run in iterations, and in each iteration the schema can perform similar greedy decisions. Similar to primal-dual schema 202, the blended schema 102 can maintain a cumulative dual instead of a separate dual for each iteration. Unlike primal-dual schema 202, the cumulative dual need not strictly require the maintenance of a feasible dual, but rather might only guarantee that the dual will become feasible by the end of the algorithm. Like primal-dual schema 202, the greedy decisions can be based on the current dual. Since the dual is generally guaranteed to become feasible at the end of the algorithm, it is not always possible to preserve the property that the revenue of a primal equals the value of the dual. Instead, one can choose a parameter $F \geq 1$.

Additional revenue collected in the current iteration can be paid 1/F times that revenue in the value of the dual. Accordingly, the dual constraints can be covering constraints, hence paying extra in the dual can only add to dual feasibility. Like the dual-fitting schema 204, this 1/F can be seen as a scaling-up factor for the dual in order to guarantee the dual-feasible at the end of the algorithm. In fact, that is how F is typically determined in accordance with the dual-fitting schema 204. It can be the maximum $F \geq 1$, which guarantees the dual-feasibility property at the end of the algorithm. Unlike the dual-fitting schema 204, one need not scale up at the end of the algorithm, but instead can keep scaling up during the algorithm so that subsequent iterations can take advantage of the extra dual paid in the current and previous iterations.

It is to be appreciated that unlike earlier applications of dual-fitting schema 204, the dual objective function can have two different kinds of dual variables. Since there can be two kind of dual variables, one can pay the extra dual in more than one way. For example, it can be selected to pay any extra dual into an $\alpha_i$ element (detailed in connection with FIG. 3). However, because the setting can be online, another complication arises in that, in principle, each iteration could possibly be the final iteration. Accordingly, the blended schema 102 can provide notification that the dual must be feasible at the end of the algorithm. Hence, the dual must be feasible after every iteration in the event that no more items arrive and the current iteration is in fact the final iteration. It should be further appreciated that the constraints corresponding to the future items can be allowed to be violated. As such, the online nature of the problem can be handled naturally, and the blended schema 102 need not consciously take into account the online nature of the problem.

Figure 3:
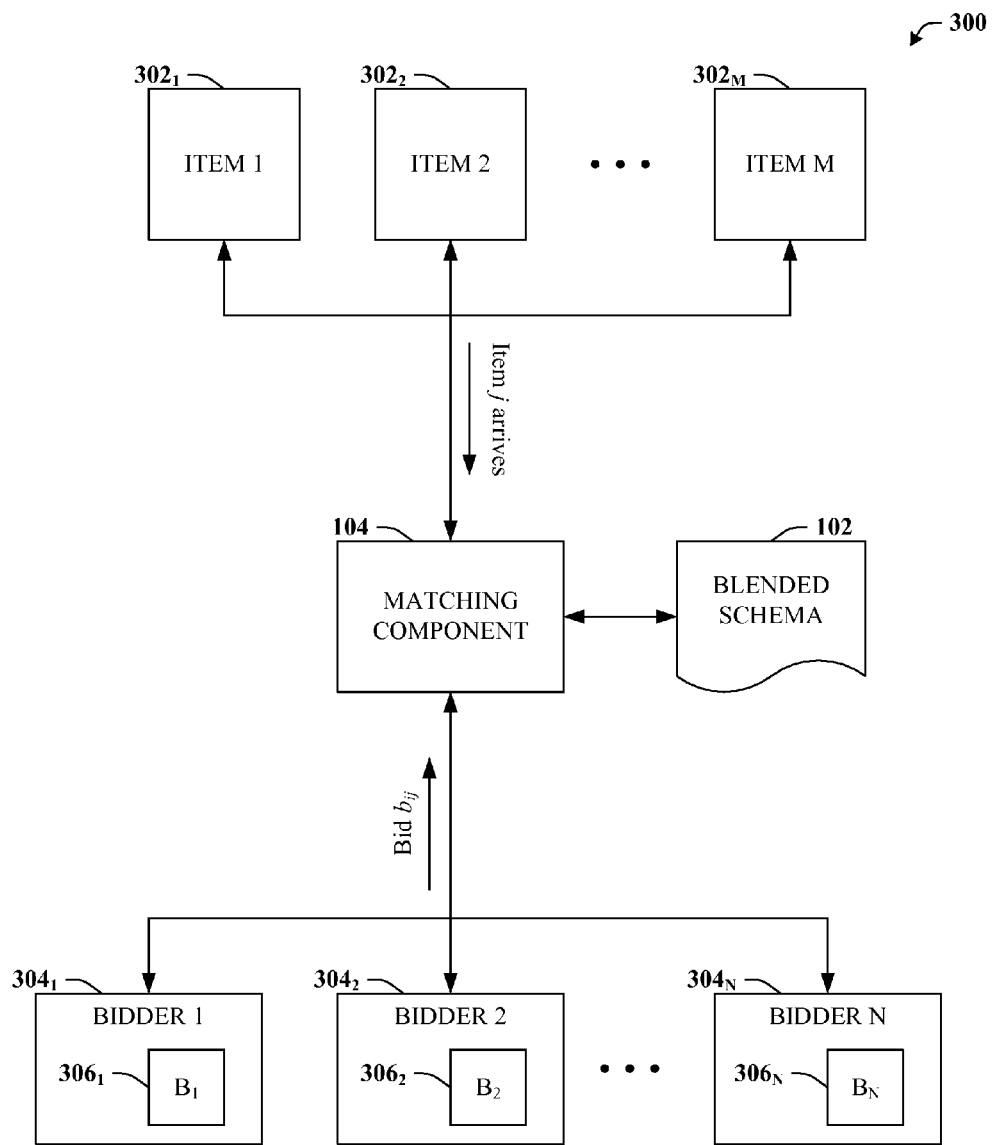
FIG. 3 depicts an example framework for an online matching problem.

With reference now to FIG. 3, an example framework 300 of an online matching problem is illustrated. As depicted, the framework 300 includes the matching component 104 that can employ the blended schema 102 to match items $302_1$-$302_M$ to respective bids, b, from bidders $304_1$-$304_N$, where M and N are arbitrary whole numbers indexed by j and i, respectively. It is to be appreciated that items $302_1$-$302_M$ (as well as bidders $304_1$-$304_N$) can be referred to either individually or collectively as items 302 (or bidders 304), even though each of the items 302 (or bidders 304) can have unique characteristics that distinguish from other items 302 (or bidders 304).

Typically, each bidder 304 includes a budget 306, denoted $B_i$ that can be employed to bid on items 302, which can arrive sequentially. Hence, when an item 302 arrives (e.g., becomes available for bids), the bidders 304 can provide their respective bids, $b_{ij}$, for the item 302. Item 302 can be allocated to any bidder 304 who will be charged the lesser of $b_{ij}$ and the associated residual budget 306, $B_i$. An advantageous result for the matching component 104 is to allocate the items 302 as they arrive in a manner that yields the largest possible revenue in the context of an online setting. The performance in an online setting can measured with respect to the best offline algorithm. As indicated supra, a competitive ratio of an online algorithm is the ratio of the revenue generated by the online algorithm to the revenue generated by the best offline algorithm.

As can be seen, online bid matching is an non-weighted version of this problem. Each $b_{ij}$ is either 0 or 1, and the budget 306 for each bidder 304 is b. Previous work developed a deterministic algorithm with competitive ratio $1-(1/e)$ when b is very large. More recent work generalized this deterministic algorithm to a weighted case when $b_{ij}$ are not necessarily 0 or 1. The more recent work provided a complicated proof of their algorithm under the assumption that the maximum $b_{ij}$ is negligible compare to the minimum budget 306, $B_i$. As one can observe from available bid data provided by online marketing sources, bids for online items (e.g., $b_{ij}$) can range from 10 cents to more than 100 dollars, a factor of 1000. Thus, it is quite possible that a particular bid, $b_{ij}$, of a bidder 304 can in fact be more than the entire daily budget 306 of another bidder 304.

Accordingly, a more realistic assumption is that each $b_{ij}$ is negligible compare to $B_i$. For example, a bid, $b_{ij}$, from a particular bidder $304_i$ is negligible compare to that particular bidder's own budget, $B_i$. It is to be appreciated that typical conversion rate from click to acquisition is on the order of few percentage points, so in order to gain a meaningful benefit from, e.g., a search advertisement, a bidder 304 should at least have a budget 306 large enough to purchase at least hundreds of clicks (e.g., items 302), justifying the assumption that the bid, $b_{ij}$, is negligible compare to the budget 306, $B_i$.

In accordance with the foregoing, the blended schema 102 can be employed by the matching component 104 to satisfy the identical competitive ratio $1-(1/e)$ as previous work. In addition, the blended schema 102 can be simpler to implement and analyze over previous work, as the solutions can be as straightforward as solving a differential equation, as illustrated infra. Moreover, the blended schema 102 can be employed under the relaxed assumption of $b_{ij}$ is negligible compare to $B_i$. Due to this simplicity as well as other advantageous features provided by the blended schema 102, the notion of allocating items 302 can be extended to include various other aspects. For example, allocating items 302 can include a risk assessment feature as described in more detail in connection with FIG. 4. As another example, the blended schema 102 can allow for theoretically sound engineering adaptation to support practical scenarios to achieve competitive ratio beyond $1-(1/e)$, as detailed with more particularity with reference to FIG. 5.

With the foregoing in mind, consider the following algorithmic proofs in connection with the online matching problem and the blended schema 102. As an preliminary matter, consider first a linear program for the offline case after an arbitrary number of items 302 have arrived. Let $x_{ij}$ be a 0-1 variable denoting whether j is allocated to i. If so, $x_{ij}=1$, but equal to 0 otherwise, and an associated linear relaxation can allow $x_{ij}$ to take any value in [0, 1]. The following is the natural linear relaxation of the problem of maximizing revenue in the offline setting.

$$\max \sum_{i,j} b_{ij} x_{ij}$$

$$\forall i: \sum_i b_{ij} x_{ij} \leq B_i$$

$$\forall j: \sum_j x_{ij} \leq 1$$

$$\forall i, j: x_{ij} \geq 0,$$

where the first constraint indicates that one cannot charge a bidder 304 more than that bidder's 304 budget 306. The second constraint specifies that an item 302 cannot be assigned to more than one bidder 304.

Since an algorithm can be derived utilizing the blended schema 102, it is necessary to write the dual of the above program. For the sake of illustration, the variable $\alpha_i$ is selected for the first set of constraints and variable $\beta_j$ is chosen for the second set of constraints. It follows that the dual program is:

$$\min \sum_i B_i \alpha_i + \sum_j \beta_j$$

$$\forall i, j: b_{ij} \alpha_i + \beta_j \geq b_{ij}$$

$$\forall i, j: \alpha_i \geq 0, \beta_j \geq 0$$

Accordingly, $F \leq 1$ can be the desired competitive ratio sought. A dual-fitting algorithm as adapted for maximization problem (e.g., as detailed supra in connection with the dual-fitting schema 204 from FIG. 2) can be employed as follows. The dual-fitting algorithm selects a primal and a potentially infeasible dual of the same value. Subsequently, the dual can be scaled by a factor of 1/F along with a proof that this scaling would generate the dual feasible. Hence the approximation ratio of the algorithm can be F.

Based upon the alterations described supra, the dual-fitting schema can be modified appropriately. For example, instead of paying the factor of 1/F at the end of the algorithm in order to make the dual feasible, the factor of 1/F can be paid during the run-time of the algorithm. The dual constraints of the previously iterated items 302 can be kept feasible. Such a technique has a number of advantages over conventional techniques, at least one of which is especially useful for online setting. In particular, since the dual is already paying a factor of 1/F during the run, the algorithm could adapt itself to take advantage of this extra dual. For example, the blended schema 102 can be employed to derive an algorithm that maintains the following properties:

A feasible primal.

A feasible dual with constraints for the previously iterated items only.

(primal objective function/dual objective function)=F.

Initially, prior to the arrival of an item, none of the primal variables need be defined. Among the dual variables only the $\alpha_i$ terms need be defined, which can be initialized to 0. The introduction of $\beta_j$ and $x_{ij}$ for all i can be produced as an item 302 arrives. The arrival of an item 302 can also generate the corresponding dual constraints, $b_{ij}\alpha_i+\beta_j \geq b_{ij}$, for all i.

Since it can be desirable to keep the dual feasible, $\beta_j$ can be set to equal $\max_i b_{ij}(1-\alpha_i)$ in order to make the dual feasible with constraints for the previously iterated items 302. The item 302 can be allocated to any bidder 304, say i*, who attains the maximum of $b_{ij}(1-\alpha_i)$. It should be underscored that the earned revenue in the primal can be $b_{i*j}$, while only $b_{i*j}(1-\alpha_{i*})$ need be paid in the dual. Since it can be desirable to pay the 1/F factor in the dual, an additional $b_{i*j}/F-b_{i*j}(1-\alpha_{i*})$ can be paid by suitably increasing $\alpha_{i*}$ by $(b_{i*j}/F-b_{i*j}(1-\alpha_{i*}))/B_{i*}$. This increase in $\alpha_{i*}$ can be likened to the slack in the performance which allows i* to be less optimal in the future. It is readily apparent that the above relates to a factor F algorithm. Hence, a likely next question can be directed to the constraints on F. Unlike certain recent approaches, the above need have only simple constraints on F such as, for example, that $\alpha_i$ should become 1 by the time the budget 306 is exhausted. Otherwise the algorithm may try to allocate an item to the bidder with zero budget (mathematically, causing the increase in $\alpha$ to be negative.) A simple differential equation, as follows, illustrates that $F \leq 1-(1/e)$ satisfies this constraint. To obtain the best competitive ratio, $F=1-(1/e)$ can be selected.

Accordingly, the following theorem and an associated proof can be set forth:

Theorem 1: The algorithm according to the above description has a competitive ratio of $1-1/e-o(\epsilon)$ under the assumption that each bid is at most $\epsilon$ fraction of the bidder's 304 budget 306.

Proof:

Consider a buyer i (e.g., bidder 304) in the context of an iteration during the algorithm. Let the current value of $\alpha_i$ be $\alpha$, and further let the amount the bidder 304 has spent be a fraction, $\gamma$, of that bidder's 304 budget 306. Now consider the newly arrived item 302 is assigned to this particular bidder 304. The bidder's 304 utility for the item 302 can be b (e.g., dropping the subscript ij for the sake of brevity). Therefore the $\beta$ variable corresponding to the item 302 is set to $b(1-\alpha)$. Hence, $\alpha$ can be increased by $(b/F - b(1-\alpha))/B$. Since this particular bidder 304 spends b on the item 302, $\gamma$ can also increases by b/B. Thus:

$$\frac{\Delta\alpha}{\Delta\gamma} = \frac{1}{F} - 1 + \alpha.$$

Since it can be assumed that the bid, b, is negligible in comparison to the budget 306, B, it can also be assumed that $$\frac{\Delta\alpha}{\Delta\gamma} \approx \frac{d\alpha}{d\gamma}.$$

Accordingly:

$$\frac{d\alpha}{d\gamma} = \frac{1}{F} - 1 + \alpha,$$

or:

$$\frac{d\alpha}{\frac{1}{F} - 1 + \alpha} = d\gamma.$$

Integrating both sides, yields:

$$\ln\left(\frac{1}{F} - 1 + \alpha\right) = \gamma + C,$$

where C can be the constant of integration. Setting the initial condition, e.g., $\alpha=0$ and $\gamma=0$ at the beginning of the algorithm gives:

$$\ln\left(\frac{\frac{1}{F} - 1 + \alpha}{\frac{1}{F} - 1}\right) = \gamma.$$

By setting the final condition that $\gamma=1$, then $\alpha=1$, which yields:

$$\ln\left(\frac{1}{1-F}\right) = 1,$$

or:

$$F = 1 - \frac{1}{e}.$$

Let us now compute the factor much more precisely such as for when $b_{ij}$ is not completely negligible. Suppose $b_{ij}/B_i \geq \epsilon$. Let $F_\epsilon$ be the competitive ratio that can be supplied by the above algorithm. If the goal is to aim for a $1-(1/e)$ factor, then the algorithm can provide a relationship between $\alpha$ and $\gamma$, e.g., $\ln(1+(e-1)\alpha)\geq\gamma$. An $F_\epsilon$ that is slightly less than $1-(1/e)$ can be chosen, for instance, depending upon $\epsilon$. Thus, the relationship between $\alpha$ and $\gamma$ can be maintained. Maintaining this relationship can guarantee that $\alpha$ becomes 1 before $\gamma$ becomes 1.

Now suppose a new item 302 arrives that is assigned to i. This item 302 increases $\gamma$ (once more dropping subscript i for the sake of brevity) by at most $\epsilon$. If the above mentioned relationship between $\alpha$ and $\gamma$ is maintained, then $\alpha$ must be increased by at least $(e^{\gamma+\epsilon}-e^\gamma)/((e-1)\epsilon)$. However, $\alpha$ can be increased by $\epsilon(1/F_\epsilon-1+\alpha)$, which can be at least $\epsilon(1/F_\epsilon-1+(e^\gamma-1)/(e-1))$. The following inequality for $F_\epsilon$ can be solved as:

$$\epsilon\left(\frac{1}{F_\epsilon} - 1 + \frac{e^\gamma - 1}{e - 1}\right) \geq \frac{e^{\gamma+\epsilon} - e^\gamma}{(e-1)\epsilon}.$$

Using common upper bounds and lower bounds for exponentiation functions and reciprocal functions, a competitive ratio of at least the following can be achieved:

$$\left(1 - \frac{1}{e}\right)(1 - \epsilon(e - 2)).$$

It is to be appreciated that this bound can be tighter for smaller values of $\epsilon$. For larger values of $\epsilon$, the upper and lower bounds on exponentiation and reciprocal functions can have higher slacks.

Figure 4:
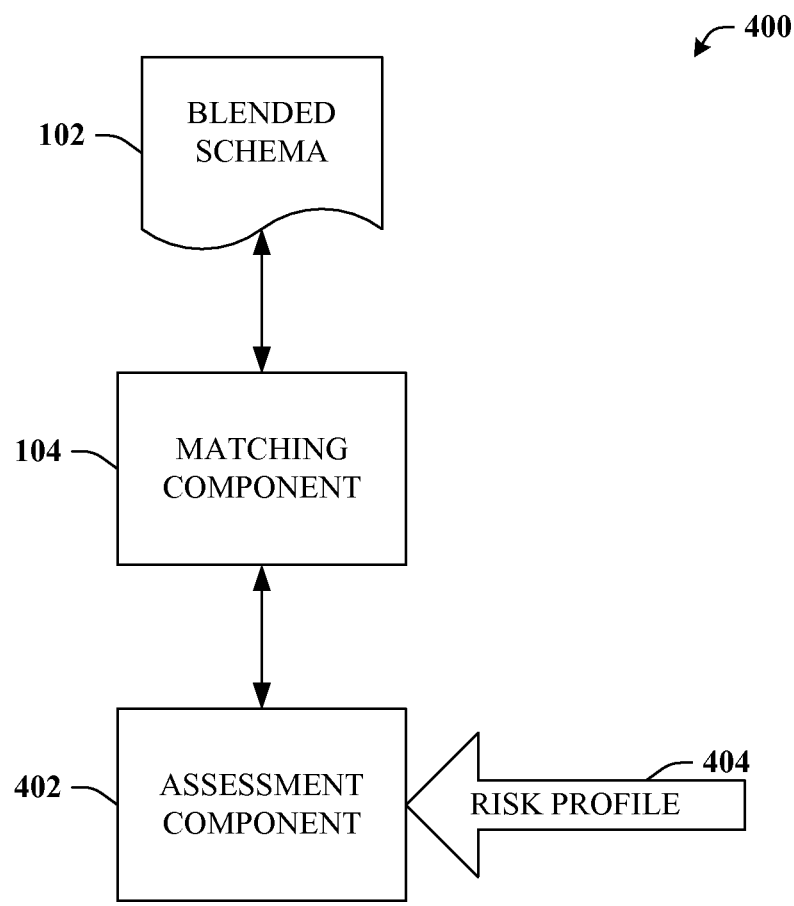
FIG. 4 is an exemplary computer-implemented system that can employ the blended schema for further generalizations.

Turning back to FIG. 1, in addition making referencing to FIG. 4, an exemplary computer-implemented system 400 that can employ the blended schema for further generalizations is illustrated. In general, the system 400 can include the blended schema 102 and the matching component 104 as substantially described supra in connection with FIG. 1. However, in certain instance, the blended schema 102 can be adapted for further applications, as introduced supra. In accordance therewith, the system 400 can also include an assessment component 402 that can manage a risk profile 404 of the advertiser 112, wherein the risk profile 404 can be associated with allocating ads 110, such as, e.g., when allocating ads 110 to ad slots 106 in excess of an advertising budget of the advertiser 112.

According to recent research in the area of ad-auctions, an argument has been put forth that budgets for online advertisers (e.g., advertiser 112) typically should not be inelastic. One reason cited is that if the clicks are profitable, e.g., the bidding advertiser is expected to make more money on a click than the bid for the click, then limiting the budget effectively limits potential profit. The research also argues the wisdom of daily budgets. That is, instead of buying 500 clicks on Saturday and 500 clicks on Sunday, in principle, it would not be less profitable to get 1000 clicks on Saturday or 1000 clicks on Sunday. Indeed, well-known ad hosts (e.g., ad host 108) implement programs that assume some flexibility with an advertiser's advertising budget. As of Oct. 31, 2005, one well known ad host has reserved the right to overspend the stated budget by 40%.

These arguments against daily budgets hold for any investment choices. For an example, if one considers investing ten thousand dollars in stock A, and ten thousand dollars in stock B, then the expected gain for investing twenty thousand dollars in either one of stock A or stock B would not be less profitable in expectation (estimated with whatever means). Still, the common wisdom is to diversify, and the primary reason for such is "Risk Management". Various stock brokers offer various tools for stock traders to do "Real Time Risk Management". For instance, if a given stock reaches a certain level, then execute a trade for this stock (as well as, e.g., corresponding call/put options).

Contributors to the industry are proposing Risk Management for ad-auctions as well. The simplest form of risk management is to limit the investment, which is essentially what notion of budget for advertising spending provides. However, there exists a way in which Real Time Risk Management can be employed while still allowing the concept of an elastic advertising budget. For example, instead of strict budgets, one can allow a bidder to specify how aggressive she wants to be in her bidding. Hence, a bidder may specify that she wants to bid aggressively for the first, say, one-hundred dollars of her budget. However, after she has spent one-hundred dollars, she still wants to buy ad-slots if she gets them at, say, half of her bid. In general, she has a monotonically decreasing function, $f$, of budget spent, which specifies how aggressive she wants to bid. The function can be normalized $f(0)=1$, such that at the zero spending level she is fully aggressive. If she has spent x dollars then her next bid is scaled by a factor of $f(x)$.

It should be understood that the generalized online matching is a special case of this more general problem detailed supra. If the advertiser has a budget of B in the generalized online matching setting then she can specify the function $f(x)=1$, if $x<B$ and $f(x)=0$ if $x \geq B$ in the Real Time Risk Management setting. It is to be further understood that since $f$ is a monotonically decreasing function, the revenue obtained by giving her a set of items is a concave function. Let $b_{ij}$ be her bid for the j-th item then the revenue she makes with an assignment vector $x_{ij}$ is $R_i(\Sigma_j b_{ij} x_{ij})$, where $R_i$ is a monotonically increasing concave function, which is zero at zero. The continuous relaxation of this problem is a convex program instead of a linear program. Thus:

$$\max \sum_i R_i \left( \sum_j b_{ij} x_{ij} \right)$$

$$\forall j : \sum_j x_{ij} \leq 1$$

$$\forall i, j : x_{ij} \geq 0.$$

Since one interesting aspect can reside in solving this problem integrally, the following assumption can be made. Each $R_i$ can be a piecewise linear function with sufficiently long pieces. It should be appreciated that it need not be specified that each bid is negligible compare to the length of the pieces. The assumption of sufficiently long pieces can also imply that each bid is negligible. It can be shown that a competitive ratio of $1-(1/e)$ can be applicable for this problem, just as generalized online matching of the previous sections satisfy similar assumptions. In essence, the problem at hand can be a generalized problem with two pieces. The length of the first piece can be the budget and the length of the second piece can be assigned to infinity.

Initially, the algorithm of the previous section can be adapted with only two pieces. The generalization to a greater number of pieces can be arithmetically complicated but, conceptually, a straightforward notion. With two pieces, the convex program can become the following linear program (for notational convenience assume $a_{i1}=1$ and $A_{i1}=0$):

$$\max \sum_i R_i$$

$$\forall i : R_i \leq a_{i1} \left( \sum_j b_{ij} x_{ij} \right) + A_{i1}$$

$$\forall i : R_i \leq a_{i2} \left( \sum_j b_{ij} x_{ij} \right) + A_{i2}$$

$$\forall j : \sum_j x_{ij} \leq 1$$

$$\forall i, j : x_{ij} \geq 0,$$

where $a_{i2} \leq a_{i1}$, and $A_{i2} \geq A_{i1}$. This above can lead to the following theorem.

Theorem 2: There is an online algorithm which solves the above linear program with a competitive ratio of $(e-1)/(e-a)$, where $a=\min\{a_{i2}\}$ under the assumption that $A_{i2} \gg A_{i1}$ and for every j, $A_{i2} \gg b_{ij}$.

It should be noted that $(e-1)/(e-a)$ is at least $1-(1/e)$, and further noted that normalization that $R_i(0)=0$ can yield $A_{i1}=0$. Hence, $A_{i2} \gg A_{i1}$ holds trivially.

Proof: We first write the dual of this program. The dual of this program is (utilizing $\alpha_{i1}$, for the first constraint and $\alpha_{i2}$ for the second constraint):

$$\min \sum_i A_{i1} \alpha_{i1} + \sum_i A_{i2} \alpha_{i2} + \sum_j \beta_j$$

$$\forall i, j : \beta_j \geq \alpha_{i1} a_{i1} b_{ij} + \alpha_{i2} a_{i2} b_{ij}$$

$$\forall i : \alpha_{i1} + \alpha_{i2} \geq 1$$

$$\forall i, j : \alpha_{i1} \geq 0, \alpha_{i2} \geq 0, \beta_j \geq 0$$

Terms can be initialized as $\alpha_{i1}=1$ and $\alpha_{i2}=0$. Again let F be the competitive ratio we are shooting for. Once more, as an item j arrives, $\beta_j$ can be set to $\max_i\{\alpha_{i1} a_{i1} b_{ij}\} + \{\alpha_{i2} a_{i2} b_{ij}\}$. Let be a buyer who attains the highest bid for the item such that the item is allocated to i*. Accordingly, $\alpha_{i*1}$ can decrease while $\alpha_{i*2}$ can increase by the same amount, so that the dual objective function increases by 1/F factor times the increase in the primal objective function. Erstwhile, the constraints on F can be assessed.

The subscript i can again be dropped for convenience. $R=\min\{a_1(\Sigma_j b_j x_j)+A_1, a_2(\Sigma_j b_j x_j)+A_2\}$. The second term is applicable, e.g., when $\Sigma_1 b_j x_j = (A_2-A_1)/(a_1-a_2)$, which is the point of intersection between both the pieces. Now, $\gamma=((a_1-a_2)/(A_2-A_1)) \Sigma_j b_j x_j$ can be used. Once more, the same type of differential equation can be found with a similar type of boundary condition that $\alpha_2$ must become 1 (hence $\alpha_1$ must become 0) before $\gamma$ becomes 1. Solving for F yields the suitable results.

The results can be extended to a greater number of pieces, as follows. Let the subscript k be utilized to denote a piece of a piecewise linear concave function. Thus, the above notations can be extended in a natural manner as $a_{ik}$, $A_{ik}$, $\alpha_{ik}$.

Theorem 3: There is an online algorithm which solves the above problem with k pieces with a competitive ratio of $(e-1)/(e-a)$, where $a=\min\{a_{ik}\}$, under the assumption that $0=A_{i1} \ll A_{i2} \ll A_{i3} \ll \ldots \ll A_{ik}$, and for every j and k, $A_{ik} \gg b_{ij}$.

Proof: Support for the theorem 3 can be found in the same argument set forth supra. Dropping the subscript i, $\alpha_1=1$ and $\alpha_2=\alpha_3=\ldots=\alpha_k=0$. When the bidder is on the first piece, $\alpha_1$ can be decreased and $\alpha_2$ can be increased. F can be selected such that by the time the bidder reaches at the intersecting point of the first and the second piece, $\alpha_2$ must have become 1 and $\alpha_1$ must have become 0. Now, when the bidder is on the second piece, $\alpha_2$ can be decreased and $\alpha_3$ can be increased, each by the same amount. Accordingly, F can be chosen such that by the time the bidder reaches at the intersecting point of the second and the third piece, $\alpha_3$ must have become 1 and $\alpha_2$ must have become 0.

It should be appreciated and understood that a slightly weaker condition, e.g., that $A_{i2}/a_1 \ll A_{i3}/a_2 \ll \ldots \ll A_{ik}/a_{k-1}$ can also suffice. The reason is that $A_{it}/a_{t-1}$ is approximately the intersecting point of the (t−1)-th piece and t-th piece. Hence, each statement $A_{it}/a_{t-1} \ll A_{it+1}/a_t$ can imply that that the t-th piece is sufficiently long.

In the above algorithms it can be advantageous for the $x_{ij}$ terms to be integral. It can be conjectured that if the $x_{ij}$ terms are not limited to being integral, then the convex program can be optimized in an online fashion within a factor of $1-(1/(e-\epsilon))$ within an arbitrarily small $\epsilon$. Certain market equilibrium problems in historical settings (e.g., as described by Fisher) can be special cases of this convex program. With a slight error, even market equilibrium with linear utilities in the Fisher setting can be converted into the framework of this program. In this case, the constraints can be exactly the same, denoting that a good or item cannot be allocated beyond what is available. $R_i(\Sigma_j b_{ij} x_{ij})$ can be $m_i \ln(\Sigma_j u_{ij} x_{ij})$, where $m_i$ is the endowment of the i-th buyer and $u_{ij}$ is the utility for consuming one unit of j. Note that the ln can be a monotonically increasing concave function. Yet one issue is that this is not zero at zero.

Suppose the $u_{ij}$ terms are large numbers and that all participants have an adequate budge to purchase a bundle of items with large utility. In this case, $m_i \ln(\Sigma_j u_{ij} x_{ij})$ can be approximated with $m_i \ln(1+\Sigma_j u_{ij} x_{ij})$. Jain and Talwar propose to use the notion of market equilibrium in ad-auctions by employing stochastic settings to compute market equilibrium, which in single ad-slot per page case, can be a linear utility market equilibrium problem according to the Fisher setting. One interesting case is an online algorithm with a non-trivial competitive ratio. In certain settings, $u_{ij}$ can be the bids $b_{ij}$, while utility can be set to money in a bidder's budget, since it would be irrational to purchase a bundle of items with a lower utility than the utility of the budget. Thus, at equilibrium all participants will have at least as much utility as her initial budget. If the initial budgets are large then $m_i \ln(\Sigma_j u_{ij} x_{ij})$ can be again approximated with $m_i \ln(1+\Sigma_j u_{ij} x_{ij})$.

Figure 5:
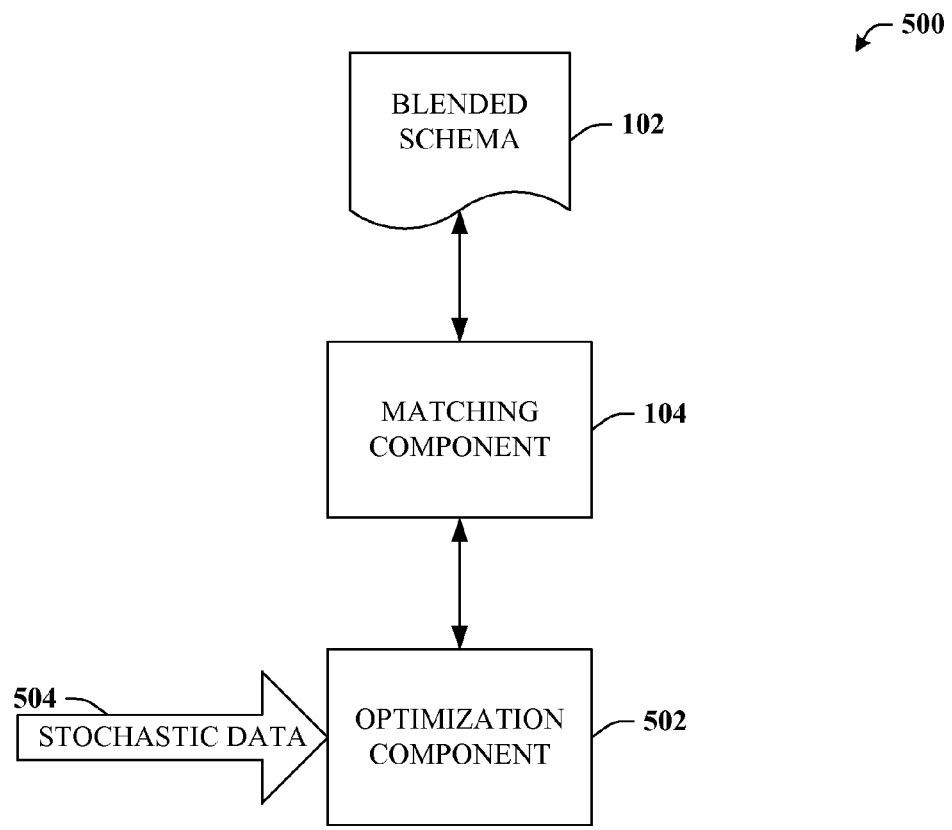
FIG. 5 depicts an exemplary computer-implemented system that can further optimize matching and/or allocation of items.

Turning now to FIG. 5, an exemplary computer-implemented system 500 that can further optimize matching and/or allocation of items is depicted. In general, the system 500 can include the matching component 104 that can utilize the blended schema 102 as substantially described herein. In addition, the system 500 can also include an optimization component 504 that can employ stochastic information 504 in order to, e.g., optimize ad allocation. For example, returning to the previous setting of generalized online matching, one can assume that stochastically or with historical experience it can be inferred that a bidder, i, is likely to spend a good fraction of her budget. Thus, it can be desirable to tweak the algorithm so that the algorithm's worst case performance improves. As we tweak the algorithm it is likely that the bidder may spend a larger or smaller fraction of her budget. Thus, one can tweak the algorithm gradually until some steady state is reached, e.g., no more tweaking is required. Suppose at the steady state, the bidder is likely to spend g fraction of her budget.

Consider the arrival of the first item, which can be assigned to bidder i, at which point $\alpha_i=0$, so $\beta_j$ can be set to $b_{ij}$. The constraint corresponding to i,j is satisfied, but as the algorithm progresses, $\alpha_i$ increases say beyond $\delta$, which can be chosen later. So the tight inequality corresponding to the first item gets a slackening of $\delta b_{ij}$ by the end of the algorithm. The idea to obtain better performance can be to use this slack up front. Thus, one can under-satisfy the inequality corresponding to the first item. As the algorithm progresses normally the inequalities become feasible.

Suppose we have $\lambda_i$, which is initially $\delta_i$. When an item arrives, one can give the item to the bidder who maximizes $b_{ij}-\alpha_i b_{ij}-\lambda_i b_{ij}$. This time one can choose the parameter $F_i$, which is potentially different for different bidders (again denoted by i), where the fraction of i-th bidder's budget is already spent. For convenience, one can drop the subscript i, such that now the algorithm has two phrases. One when $\lambda$ is non-zero, and a second for when $\lambda$ is zero. When $\lambda$ is non-zero we can decrease $\lambda$ by the same amount as we increase $\alpha$, so $\alpha+\lambda$ does not change. This gives us an even simpler differential equation, as listed infra.

$$\frac{d\alpha}{d\gamma} = \frac{1}{F} - 1 + \delta.$$

Solving this, and the boundary condition that $\alpha=0$ when $\gamma=0$, gives $\alpha=((1/F)-1+\delta)\gamma$. After g fraction of the budget has been spent, the algorithm could terminate anytime. Hence at $\gamma=g$, $\alpha$ must become $\delta$. This yields $\delta=(1/F-1)/(1-g)$.

At this point $\gamma$ is zero, so the same differential equation as before can be provided, but with different boundary condition. At $\gamma=g$, $\alpha=\delta$; and at $\gamma=1$, $\alpha=1$.

$$\ln\left(\frac{1}{F}-1+\alpha\right) = \gamma + K,$$

where K is the constant of integration. Using both the boundary conditions:

$$F=1-(1-g)e^{g-1}$$

As should be expected, F is 1 for g=1; and F=1−1/e for g=0. The derivative of F with respect to g is $ge^{g-1}$, which is positive. Hence, for non-zero estimates of g, F can be superior to 1−1/e. Furthermore, the gain in F can increase exponentially faster with respect to g. Thus, even a small number of estimates of g can increase F significantly.

It should be appreciated that one or several of the components described herein, such as, for example, the matching component 104, the assessment component 402, the optimization component 502, or the like can examine the entirety or a subset of the data available (e.g., stochastic information, empirical data, keywords, ad slots, previous bids . . . ) and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
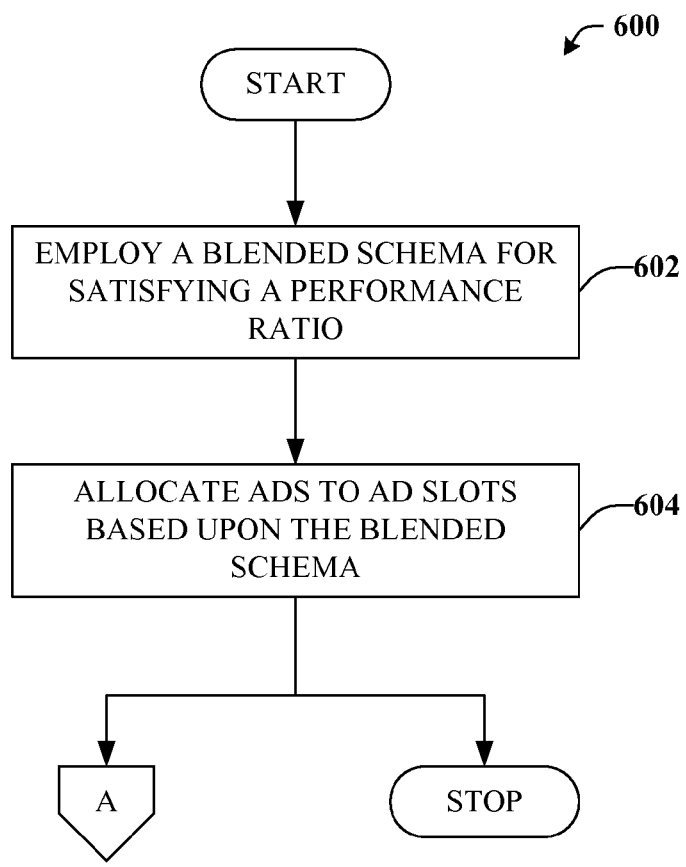
FIG. 6 is an exemplary computer implemented method for allocating ads from advertisers to ad slots from ad hosts.

FIG. 6 illustrates methodology 600 in accordance with the claimed subject matter. While, for purposes of simplicity of explanation, this and other methodologies herein are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, an exemplary computer implemented method 600 for allocating ads from advertisers to ad slots from ad hosts is depicted. At reference numeral 602, a blended schema can be employed for satisfying a performance ratio. A conventional online performance ratio is typically 1−1/e or 63.2%, which can suggest a desirable performance metric. In accordance therewith, the blended schema can incorporate distinct aspects of both a dual-fitting schema and a primal-dual schema as substantially described supra.

At reference numeral 604 the ads from advertisers can be allocated to available ad slots, e.g., as they arrive or become available. Such allocating can be based at least in part upon the blended schema and/or algorithms provided for by the blended schema. For example, the desirable performance ratio associated with reference numeral 602 above, can be associated with achieving a particular performance with respect to ad slot sales revenue. Accordingly, the allocating can include matching the ad slots to a premium bidder for that item in a manner that tends to maximize the sales revenue.

Figure 7:
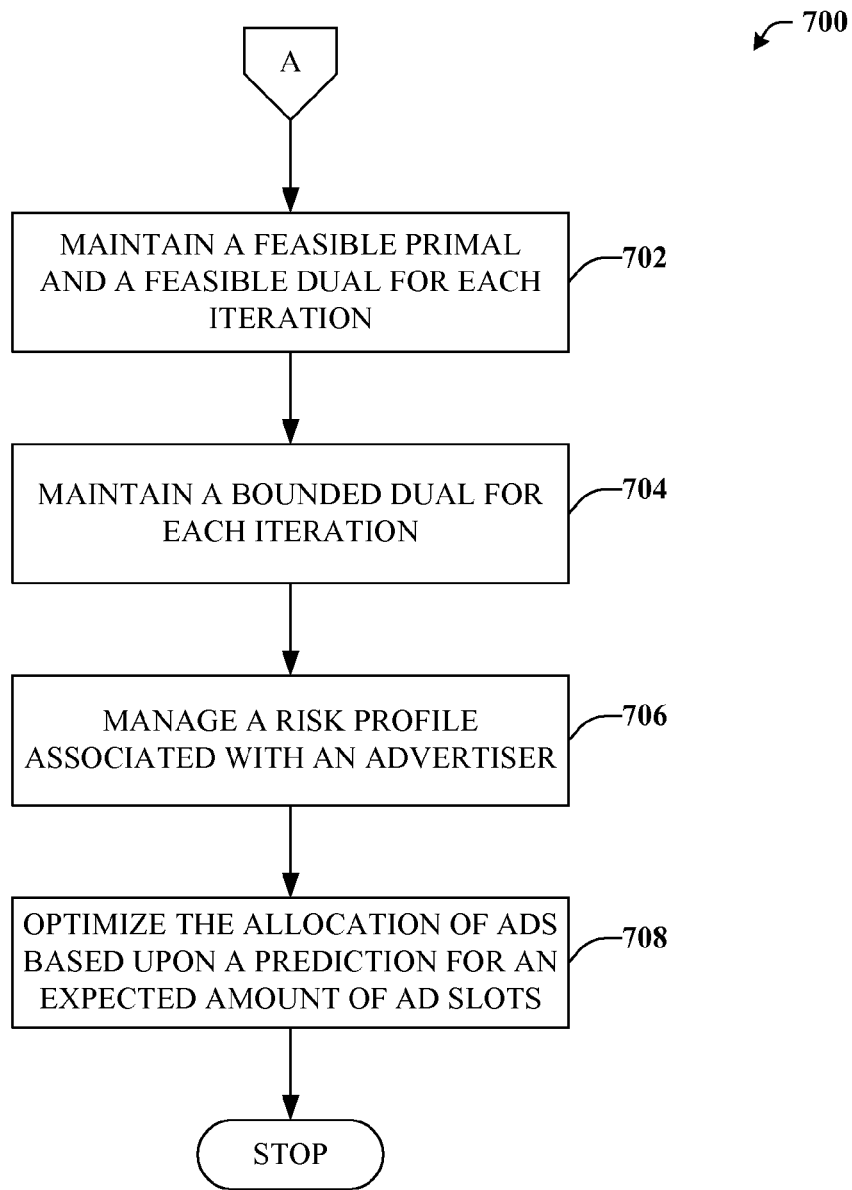
FIG. 7 illustrates an exemplary computer implemented method for employing additional features for allocating ads from advertisers to ad slots from ad hosts.

With reference now to FIG. 7, an exemplary computer implemented method 700 for employing additional features for allocating ads from advertisers to ad slots from ad hosts is illustrated. Generally, at reference numeral 702, a feasible primal and a feasible dual can be maintained for each iteration of an algorithm derived from the blended schema. At reference numeral 704, a bound dual can be maintained for each iteration of an algorithm derived from the blended schema. It is to be appreciated that in connection with reference numerals 702, 704, the blended schema can employ distinct aspects of various other schemas. Given the aforementioned features, maintaining feasibility for each iteration is a feature commonly associated with the primal-dual schema, whereas bounding the duals for each iteration is typically a feature of dual-fitting schema. However, the blended schema can provide for both features simultaneously.

At reference numeral 706, a risk profile associated with an advertiser can be managed based upon, for example, assigning a certain level of aggressiveness to bids for ad slots based upon the total number of ad slots already filled for that advertiser. Moreover, it is to be appreciated that the managing of a risk profile can entail spending in excess of a designated budget in accordance with the risk profile. For example, ad spending can be adjusted based upon a remaining percentage of a budget, the percentage the budget that has been overspent, as well as other factors described herein.

At reference numeral 708, the allocation of ads can be further optimized based upon a prediction for an expected amount of ad slots. This stochastic information can provide a prediction for the amount of ad slots that should become available, but it is to be appreciated that even if the prediction is inaccurate, the optimization will generally never fall below the base competitive ratio.

Figure 8:
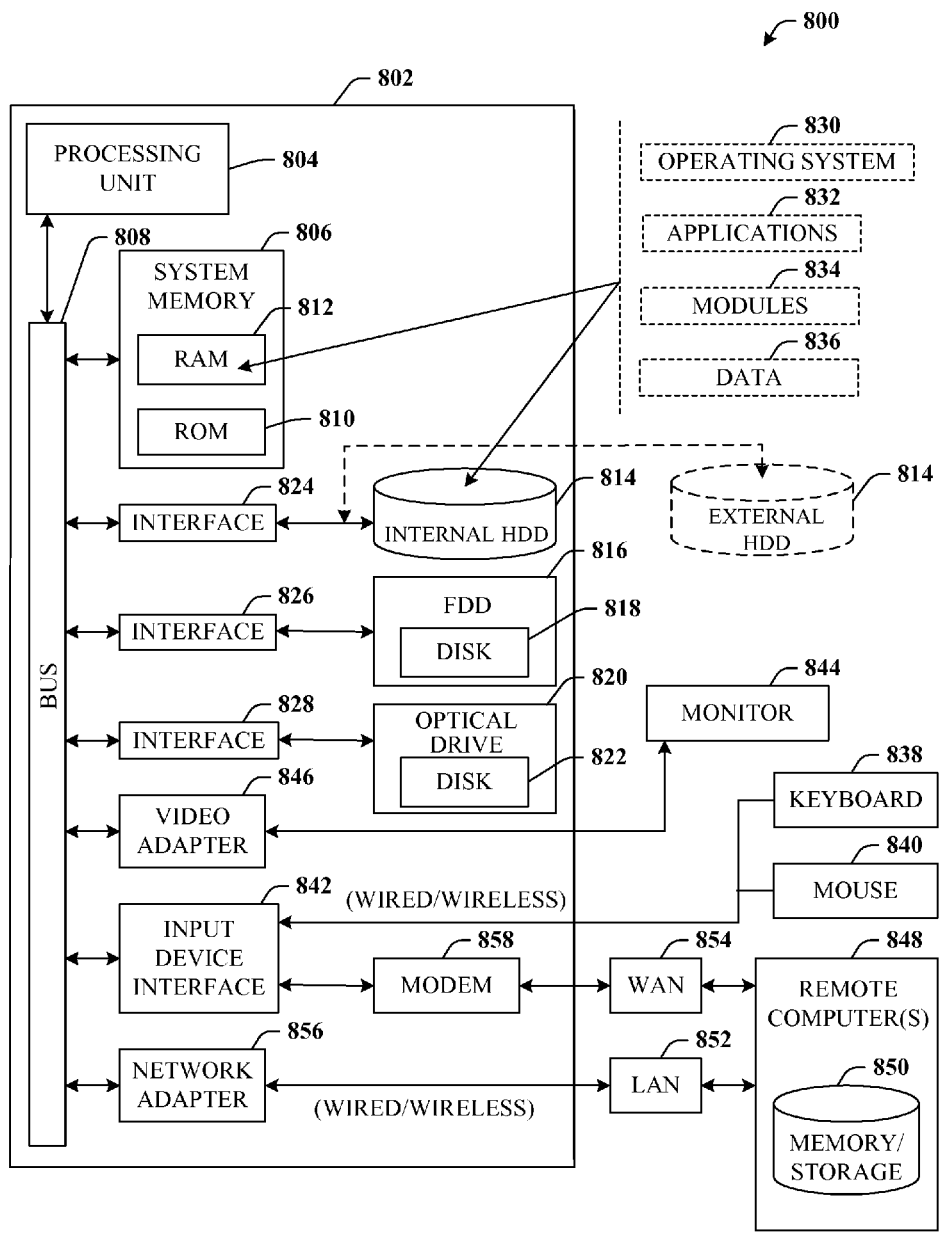
FIG. 8 illustrates a block diagram of a computer operable to execute the disclosed architecture.

Referring now to FIG. 8, there is illustrated a block diagram of an exemplary computer system operable to execute the disclosed architecture. In order to provide additional context for various aspects of the subject invention, FIG. 8 and the following discussion are intended to provide a brief, general description of a suitable computing environment 800 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the invention includes a computer 802, the computer 802 including a processing unit 804, a system memory 806 and a system bus 808. The system bus 808 couples to system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE-1394 interface technologies. Other external drive connection technologies are within contemplation of the subject invention.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, a serial port, an IEEE-1394 port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE-802.11 (a, b, g, etc.) to provide secure, reliable, fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
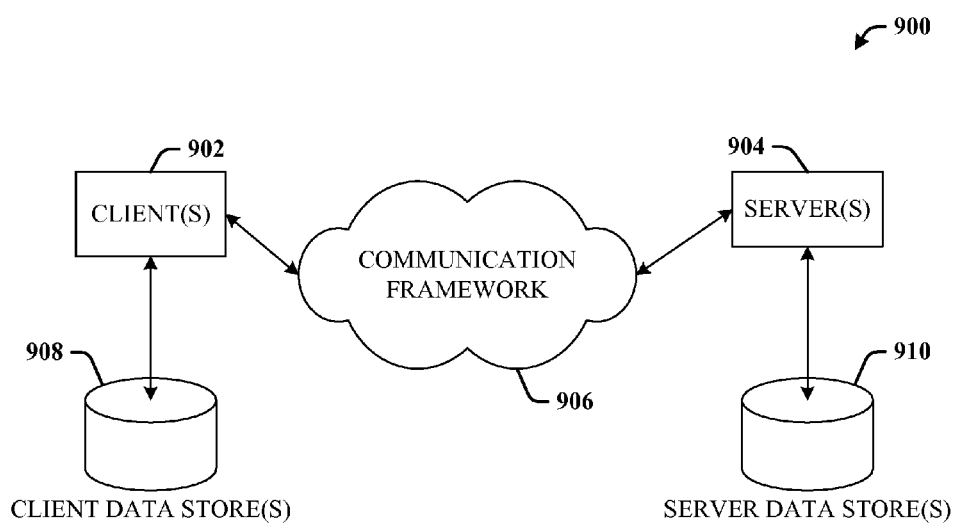
FIG. 9 illustrates a schematic block diagram of an exemplary computing environment.

Referring now to FIG. 9, there is illustrated a schematic block diagram of an exemplary computer compilation system operable to execute the disclosed architecture. The system 900 includes one or more client(s) 902. The client(s) 902 can be hardware and/or software (e.g., threads, processes, computing devices). The client(s) 902 can house cookie(s) and/or associated contextual information by employing the invention, for example.

The system 900 also includes one or more server(s) 904. The server(s) 904 can also be hardware and/or software (e.g., threads, processes, computing devices). The servers 904 can house threads to perform transformations by employing the invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that allocates advertisements to ad-slots, comprising:
   a memory;
   a processing unit coupled to the memory;
   a blended schema that incorporates properties of both a primal-dual schema and a dual-fitting schema, the blended schema simultaneously maintaining feasible duals and bounded duals for individual iterations, wherein:
      a property of the primal-dual schema that is incorporated into the blended schema includes maintaining the feasible duals for individual iterations; and
      a property of the dual-fitting schema that is incorporated into the blended schema includes maintaining the bounded duals for individual iterations; and
   a matching component configured to be operated on the processing unit to match an ad slot offered by an ad host to an ad from an advertiser based at least in part upon the blended schema under a relaxed assumption that a bid from the advertiser is negligible compared to an advertising budget of the advertiser and is to be ignored.

2. The system of claim 1, wherein the blended schema provides results with a competitive ratio of at least $1-(1/e)$.

3. The system of claim 1, wherein the blended schema maintains a feasible primal for individual iterations.

4. The system of claim 1, wherein the blended schema maintains that a quotient of a primal objective function over a dual objective function equals a value, F, wherein F is an approximation ratio that is less than or equal to 1.

5. The system of claim 4, wherein the value, F, equals a competitive ratio of $1-(1/e)$.

6. The system of claim 1, further comprising an assessment component configured to be operated on the processing unit that manages a risk profile of the advertiser, wherein the risk profile is associated with allocating ads.

7. The system of claim 6, wherein the risk profile relates to a purchase of the ad slot in excess of an advertising budget of the advertiser.

8. The system of claim 1, further comprising an optimization component configured to be operated on the processing unit that employs stochastic information in order to optimize ad allocation.

9. A method, executed by a processing unit for allocating ads from advertisers to ad slots from ad hosts, the method comprising:
   utilizing a blended schema for satisfying a performance ratio of $1-(1/e)$, the blended schema incorporating properties of both a dual-fitting schema and a primal-dual schema, wherein:

a property of the primal-dual schema that is incorporated into the blended schema includes maintaining feasible duals for individual iterations; and a property of the dual-fitting schema that is incorporated into the blended schema includes maintaining bounded duals for individual iterations;

evaluating the blended schema iteratively based on a greedy criteria;

simultaneously maintaining a feasible primal, a feasible dual and a bound dual for individual iterations; and allocating by the processing unit, the ads from the advertisers that are matched to the ad slots from the ad hosts based at least in part upon the blended schema under a relaxed assumption that a bid from a particular advertiser is negligible compared to an advertising budget of the particular advertiser and is to be ignored.

10. The method of claim 9, wherein the allocating the ads further comprises managing a risk profile associated with an advertiser.

11. The method of claim 9, further comprising optimizing the allocating the ads based at least in part upon a statistical prediction for an expected amount of ad slots.

12. The method of claim 9, wherein a second property of the primal-dual schema that is incorporated into the blended schema includes maintaining a cumulative dual instead of a separate dual for individual iterations.

13. A computer-implemented system for allocating ads from advertisers to ad slots from ad hosts, comprising:

one or more processors; and memory to store computer readable instructions that, when executed, cause the one or more processors to perform acts that:

utilize a blended schema for meeting a performance ratio metric of $1-(1/e)$, the blended schema incorporating properties of both a dual-fitting schema and a primal-dual schema, wherein:

a property of the primal-dual schema that is incorporated into the blended schema includes maintaining feasible duals for individual iterations; and a property of the dual-fitting schema that is incorporated into the blended schema includes maintaining bounded duals for individual iterations;

evaluate the blended schema iteratively based on a greedy criteria;

simultaneously maintain a feasible dual and a bound dual for individual iterations; and distribute the ads to the ad slots based at least in part upon the blended schema under a relaxed assumption that a bid from a particular advertiser is negligible compared to an advertising budget of the particular advertiser and is to be ignored.

14. The system of claim 13, wherein the distribution of the ads further comprises controlling a risk profile associated with an advertiser.

15. The system of claim 13, wherein the distribution of the ads further comprises dispersing the ads based at least in part upon stochastic information associated with an expected amount of the ad slots.

* * * * *